Patented Nov. 8, 1949

2,487,391

UNITED STATES PATENT OFFICE 2,487,391

2-PHENACYLPYRIMIDINES AND METHOD OF PREPARING THE SAME

James M. Smith, Jr., North Plainfield, and Barbara Roth, Middlesex, N. J., assignors to American Cyanamid Company, New York, N. Y., a corporation of Maine No Drawing. Application March 11, 1948, Serial No. 14,386

10 Claims. (Cl. 260—251)

The present invention relates to new organic compounds. More particularly it relates to 2-phenacylpyrimidines and to methods of preparing the same.

The new compounds of the present invention may be illustrated by the following general formula:

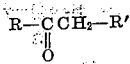

in which R is a mono-cyclic aryl radical and R' is a 2-pyrimidyl radical which may bear additional substituents.

The compounds are generally characterized as being crystalline, white to pale yellow solids, soluble in most organic solvents such as benzene, diethyl ether, isopropyl acetate, glacial acetic acid and the like, but being substantially insoluble in water. Some of the compounds are of value for the manufacture of pharmaceuticals and have an inhibitory effect on the pressor action of epinephrine whereas others may be useful in the preparation of other useful organic compounds.

The compounds of the present invention may be prepared by heating an aromatic acyl acetamidine with a 3 carbon compound capable of forming a pyrimidine ring in a substantially anhydrous, inert, organic liquid at a temperature of from 75° to about 150° C. for from about 1 hour to about 20 hours. The product may be recovered by removal of the solvent, and is then purified by recrystallization.

The intermediate, aromatic acyl acetamidine compounds may be illustrated by the general formula:

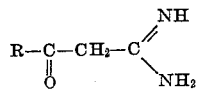

in which R is an aryl radical. The aryl radical R may contain substituent radicals such as chlorine, bromine, methyl, methoxy, nitro, carbethoxy, and the like. These compounds are new and form the subject matter of our copending application, Serial Number 2,547, filed January 15, 1948. The preparation of a representative compound of this group is described in the specific examples hereinafter.

The 3 carbon compounds capable of forming a pyrimidine ring may include such compounds as beta-ethoxyacrolein diethyl acetal, beta-methoxyacrolein dimethyl acetal, beta-ethoxyacrolein dimethyl acetal, beta-methoxyacrolein diethyl acetal, beta-ethoxyacrolein dipropyl acetal, beta-propoxyacrolein dipropyl acetal, acetyl acetone, an acetoacetic ester such as methyl acetoacetate, ethyl acetoacetate, propyl acetoacetate, and the like.

The reaction is preferably conducted in anhydrous organic solvents such as benzene, ethanol, propanol, butanol, pentanol, toluene, chloroform, glacial acetic acid, etc., or mixtures thereof, preferably under reflux conditions. The reaction may be conducted below the boiling point of the solvent or mixture of solvents; however, the time required to complete the reaction at the lower temperature is, of course, longer.

The invention will now be illustrated in greater particularity by means of the following examples in which representative 2-phenacylpyrimidines are prepared by the method described hereinbefore. These examples are illustrative and not intended to restrict the invention to the particular products or reaction conditions specifically described. All parts are by weight unless otherwise indicated.

Example 1

To ten grams of benzoylacetonitrile dissolved in 50 ml. of dry benzene is added 12.1 ml. of absolute ethanol. The mixture is cooled to 0° C. and dry hydrogen chloride gas bubbled in until saturated. It is kept at 0° C. overnight and then allowed to warm to room temperature, at which time only a small amount of crystalline material is present in the liquor. After two hours at room temperature, the mixture is practically solid. The solid is filtered off, washed with benzene, and dried in the vacuum desiccator. It is then mixed with 50 ml. of alcoholic ammonia, which has been saturated with ammonia at 0° C. After standing for three days at room temperature, the mixture is filtered from the ammonium chloride. The alcohol is distilled off, and diethyl ether added to the syrupy residue, resulting in the precipitation of 7 g. of benzoylacetamidine. After two recrystallizations from water the substance melts at 188°–189° C.

A mixture of 16 g. benzoylacetamidine, 19.52 ml. beta-ethoxyacrolein acetal, 38 ml. amyl alcohol (B. P. 124°–128° C. from Pentasol) and 10 ml. glacial acetic acid is refluxed for 10 hours, and the major portion of the solvents then distilled off at atmospheric pressure. Upon cooling the residue, 10 g. of solid crystallizes. An additional 2.1 g. is obtained from the mother liquors. Recrystallization of the product from isopropyl acetate yields 7.2 g. of 2-phenacylpyrimidine, a yellow solid melting at 147.8°–148.5° C.

Example 2

To 1 g. of 2-phenacylpyrimidine in 5 ml. of glacial acetic acid is added dropwise a solution of 0.808 g. of bromine in glacial acetic acid at 20° C. The mixture is drowned in water, resulting in the precipitation of a yellow solid. On recrystallization from ethanol 5-bromo-2-phenacylpyrimidine is obtained which melts at 144.8°–145.6° C.

Example 3

A mixture of 10 g. of benzoylacetamidine, 6.2 g. of acetylacetone, 20 cc. of mixed amyl alcohols and 6 cc. of glacial acetic acid is heated to refluxing for 12 hours. The solvents are distilled off under vacuum, and the syrupy residue washed with dilute sodium hydroxide and cold water, after which it slowly crystallizes. Approximately 12.5 g. of crude 2-phenacyl-4,6-dimethylpyrimidine is obtained. This may be purified in the form of its hydrochloride salt by dissolving in warm dilute hydrochloric acid, from which a yellow salt precipitates on cooling. The hydrochloride may be recrystallized from dilute acid or ethanol, and melts at 202°–210° C. after two recrystallizations from the latter solvent. Upon dissolving the purified hydrochloride in water and adding sodium hydroxide, the base precipitates as a light yellow solid, which melts at 74°–75.5° C.

Example 4

A mixture of 3 g. benzoylacetamidine, 2.1 cc. ethylacetoacetate, 6 cc. of mixed amyl alcohols and 2 cc. of acetic acid is refluxed for 11 hours. The solvents are distilled off under vacuum, and the residual oil is extracted with dilute sodium hydroxide, the insoluble portion being separated with the aid of ether. Upon neutralizing the alkaline solution, an oily precipitate forms which gradually solidifies. This is purified by reprecipitating from dilute sodium hydroxide solution several times with the aid of decolorizing charcoal, and then melts at 248.5°–250° C. This product on analysis corresponds very closely with the theoretical value for 2-phenacyl-4-methyl-6-hydroxypyrimidine.

We claim:

1. Compounds having the general formula:

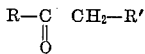

in which R is a mono-cyclic aryl radical and R' is a 2-pyrimidyl radical.

2. 2-phenacylpyrimidine.
3. 5-bromo-2-phenacylpyrimidine.
4. 2-phenacyl-4-methyl-6-hydroxypyrimidine.
5. A method of preparing compounds having the general formula:

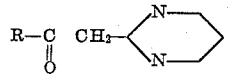

in which R is a mono-cyclic aryl radical which comprises heating together in an inert anhydrous organic liquid an aroyl acetamidine and a beta-alkoxyacrolein acetal, and thereafter recovering the said 2-aroyl methylene-pyrimidine.

6. A method of preparing compounds having the general formula:

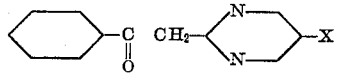

in which X is a halogen radical which comprises heating in an inert anhydrous organic liquid benzoylacetamidine and a beta-alkoxyacrolein acetal, halogenating the resulting 2-phenacylpyrimidine to obtain a 5-halo-2-phenacylpyrimidine and thereafter recovering said 5-halo-2-phenacylpyrimidine.

7. A method of preparing 2-phenacylpyrimidine which comprises heating in an inert anhydrous organic liquid benzoylacetamidine and beta-ethoxyacrolein diethyl acetal and recovering said 2-phenacylpyrimidine.

8. A method of preparing 5-bromo-2-phenacylpyrimidine which comprises heating benzoylacetamidine and beta-ethoxyacrolein diethyl acetal in an inert anhydrous organic liquid, brominating the reaction product and recovering said 5-bromo-2-phenacylpyrimidine.

9. A method of preparing 2-phenacyl-4-methyl-6-hydroxypyrimidine which comprises heating in an inert anhydrous organic liquid benzoylacetamidine and ethyl acetoacetate and recovering said 2-phenacyl-4-methyl-6-hydroxypyrimidine.

10. Compounds having the general formula:

in which R is a mono-cyclic aryl radical and R'' is a mono-halogenated 2-pyrimidyl radical.

JAMES M. SMITH, JR.
BARBARA ROTH.

No references cited.